Patented Mar. 10, 1936

2,033,696

UNITED STATES PATENT OFFICE 2,033,696

PROCESS FOR MAKING BLANC FIXÉ OF PARTICULAR SOFTNESS

Otto Englert, Wilhelm Becker, and Franz Becker, Prague, Czechoslovakia

No Drawing. Application September 28, 1934, Serial No. 746,024. In Germany March 4, 1933

4 Claims. (Cl. 23—122)

In order to make blanc fixé directly from heavy spar the crude spar is dissolved in a salt melt, freed from its impurities and the melt mixture introduced into water, as the result of which the barium sulphate, which is insoluble in water, precipitates out in the form of blanc fixé.

The blanc fixé obtained in this way, however, contains perceptible quantities of lime compounds, chiefly calcium sulphate (0.5% and more), which originate from the rock salt (which always contains gypsum) and go into solution in the melt together with the barium sulphate.

If lime is added to the barium sulphate-common salt melt in order to produce better separation of the impurities then a part thereof goes into solution in the melt together with the calcium sulphate and as a result gets into the blanc fixé. The conditions are precisely the same as in the case of "Hütten" salt which, when it is made with addition of lime, has a permanent lime content in addition to calcium sulphate (c. f. Lehmann, Chemiker Zeitung, 1916, 6, 28).

The small amount of calcium compounds in blanc fixé (probably mixed crystal formations occur) has been found to cause the blanc fixé to cake together during drying so that it can be converted into a loose fine powder only with difficulty. However, it is just a soft loose powder which is desired by the paint industry, particularly for making graphic printing inks.

It has now been found that a blanc fixé of maximum softness can be produced from heavy spar dissolved in a salt melt if the contaminating lime compounds are removed.

In order to remove the calcium sulphate from the melt an equivalent quantity of barium carbonate or witherite and an equivalent quantity of silicic acid or alumina are added. At the fusion temperature (800–900° C.) a vigorous carbon dioxide evolution forthwith occurs and, at the same time, calcium silicate or calcium aluminate, insoluble in the melt, as well as barium sulphate, the end product of the process, are formed. Instead of alumina or silicic acid, compounds containing these substances, such as kaolin or the like, may also be used.

The magnesium chloride which is always present in crude rock salt gives up all its chlorine in the form of hydrochloric acid during the fusion, owing to the moisture present in the rock salt and the presence of small quantities of steam originating from the furnace gases, and goes into the slag as insoluble magnesium oxide. The magnesium sulphate which is present in many varieties of rock salt is also converted by means of barium carbonate, with formation of barium sulphate, into insoluble magnesium oxide, or magnesium silicate in the presence of excess silicic acid.

By way of example, 100 kg. of rock salt containing 3% gypsum and 1% magnesium chloride are fused and 60 kg. of heavy spar are added. Simultaneously or even previously, 4.35 kg. of barium carbonate, corresponding to the quantity of gypsum, are introduced and also 1.6 kg. of silicic acid or pure sea sand. The reaction is completed as soon as the vigorous gas evolution which immediately sets in has ceased.

The melt at a temperature of about 900–950° C. is allowed to flow out through tap holes of, for example, 4 mm. diameter and to enter into vessels containing 22% sodium chloride solution; the path of the jet up to the surface of the salt solution may amount to 34 cm. The barium sulphate separating in the salt liquor is practically free from lime salts; analysis showed a content of 99.9% barium sulphate and only 0.04% of calcium sulphate. The resulting very soft product is particularly suited for the paper industry. The sodium chloride liquor left after separation of the barium sulphate is so pure that it can be used for electrolysis.

What we claim is:—

1. A process for making lime-free blanc fixé of particular softness consisting in dissolving heavy spar in a melt of rock salt, adding an alkaline earth compound capable of reacting with the gypsum in the rock salt to form water-insoluble alkaline-earth sulphate and calcium oxide, adding also substances capable of reacting with said calcium oxide to form calcium compounds which are insoluble in the melt, allowing the melt to settle, and introducing the melt in the form of a thin stream into an aqueous medium.

2. A process for making lime-free blanc fixé of particular softness consisting in dissolving heavy spar in a melt of rock salt, adding a substance selected from the group: barium carbonate, barium oxide, adding also a substance selected from the group: silicic acid and kaolin, allowing the melt to settle, and introducing the melt in the form of a thin stream into an aqueous medium.

3. A process for making lime-free blanc fixé of particular softness consisting in dissolving heavy spar in a melt of rock salt, adding a substance selected from the group: barium carbonate, barium oxide, to react with the gypsum contained in the rock salt with production of water-insoluble sulphate and calcium oxide, adding also substances capable of reacting with said calcium oxide to form calcium compounds which are insoluble in the melt, allowing the melt to settle, and introducing the melt in the form of a thin stream into an aqueous medium.

4. A process for making lime-free blanc fixé of particular softness consisting in dissolving heavy spar in a melt of rock salt, adding an alkaline earth compound capable of reacting with the gypsum in the rock salt to form water-insoluble alkaline-earth sulphate and calcium oxide, adding also a substance selected from the group: silicic acid and kaolin to react with said calcium oxide with production of a calcium compound which is insoluble in the melt, allowing the melt to settle, and introducing the melt in the form of a thin stream into an aqueous medium.

OTTO ENGLERT.
WILHELM BECKER.
FRANZ BECKER.